(12) United States Patent
Cantolino

(10) Patent No.: US 7,578,932 B2
(45) Date of Patent: Aug. 25, 2009

(54) CONDENSATE RECOVERY AND TREATMENT SYSTEM

(76) Inventor: Christopher Ralph Cantolino, 2614 Manatee Ave., West, Bradenton, FL (US) 34205

(*) Notice: Subject to any disclaimer, the term of this patent is extended or adjusted under 35 U.S.C. 154(b) by 286 days.

(21) Appl. No.: 11/667,143

(22) PCT Filed: Nov. 5, 2004

(86) PCT No.: PCT/US2004/037301

§ 371 (c)(1),
(2), (4) Date: May 5, 2007

(87) PCT Pub. No.: WO2006/052250

PCT Pub. Date: May 18, 2006

(65) Prior Publication Data

US 2008/0216503 A1    Sep. 11, 2008

(51) Int. Cl.
C02F 3/12 (2006.01)
B01D 15/00 (2006.01)
B01D 24/38 (2006.01)
F25D 21/14 (2006.01)
E03B 11/00 (2006.01)

(52) U.S. Cl. .................. 210/124; 210/202; 210/206; 210/232; 210/259; 210/307; 210/136; 62/285; 62/288; 422/263; 137/268

(58) Field of Classification Search .............. 210/175, 210/181, 198.1, 205, 206, 232, 234, 235, 210/294, 295, 299, 300, 255, 259, 262, 136, 210/200, 201, 202, 307, 308, 124; 62/93, 62/317, 318, 319, 288, 285, 291, 279, 303; 137/268; 422/261, 263, 264

See application file for complete search history.

(56) References Cited

U.S. PATENT DOCUMENTS 6,550,264 B1 *  4/2003  Cantolino .................. 210/206

* cited by examiner

Primary Examiner—Matthew O Savage
Assistant Examiner—Lucas Stelling
(74) Attorney, Agent, or Firm—Dorothy S. Morse

(57) ABSTRACT

A combination filter assembly housing (4) and treatment chamber (8) for use in recovering and sanitizing condensates from air conditioning systems and other sources with vapors released from dissolvable tablets (32), such as those used for treating swimming pool water or laundering purposes. Filter assembly housing (4) has a removable bottom cover, an internal p-trap and valve structure configured to reduce the likelihood of treatment vapors from treatment chamber (8) traveling back through filter assembly housing (4) and entering the associated condensate producing system. Applications can include, but are not limited to, use with systems that replenish water lost from swimming pools due to evaporation, to provide water for filling toilets, pressure washing, cleaning, and other gray water uses, and to provide potable water in areas where is in limited supply.

20 Claims, 8 Drawing Sheets

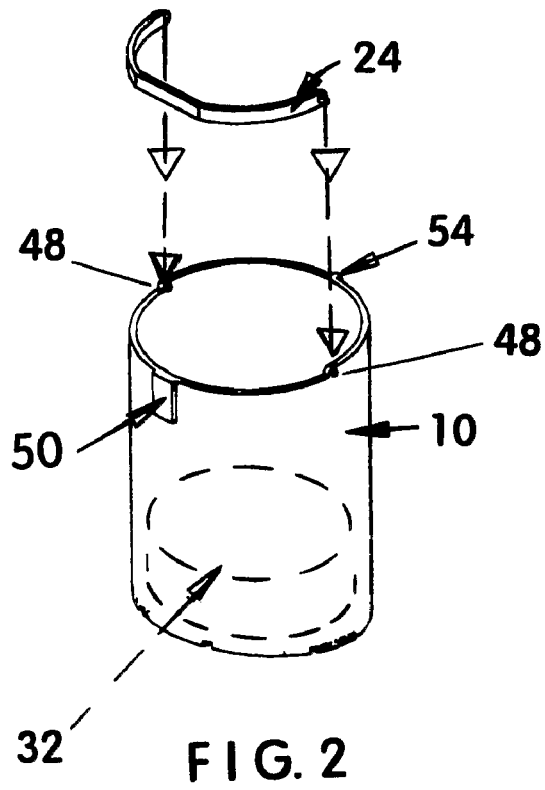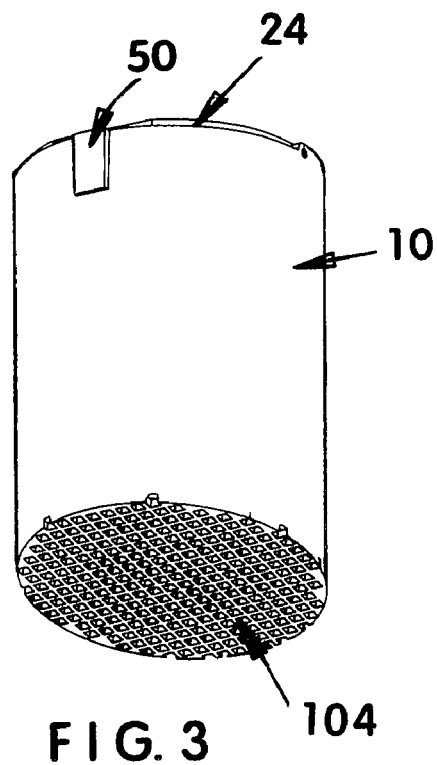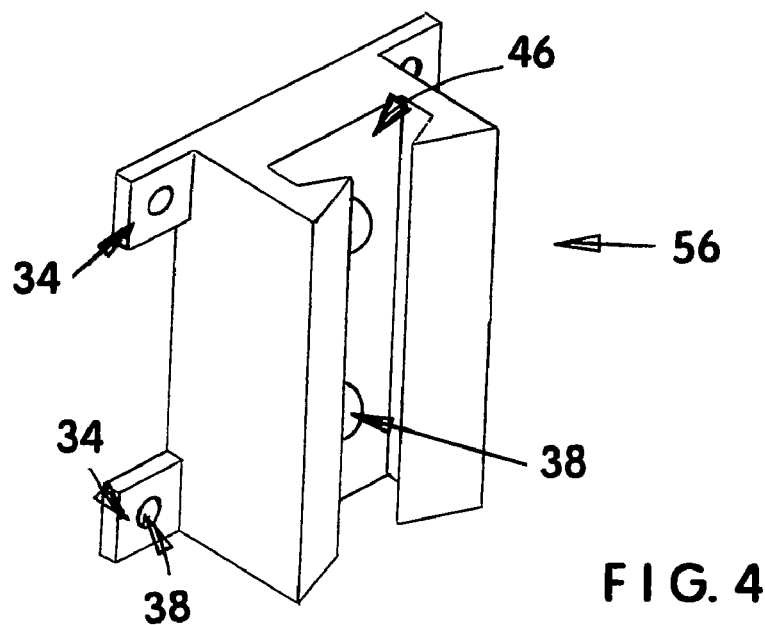

FIG. 6
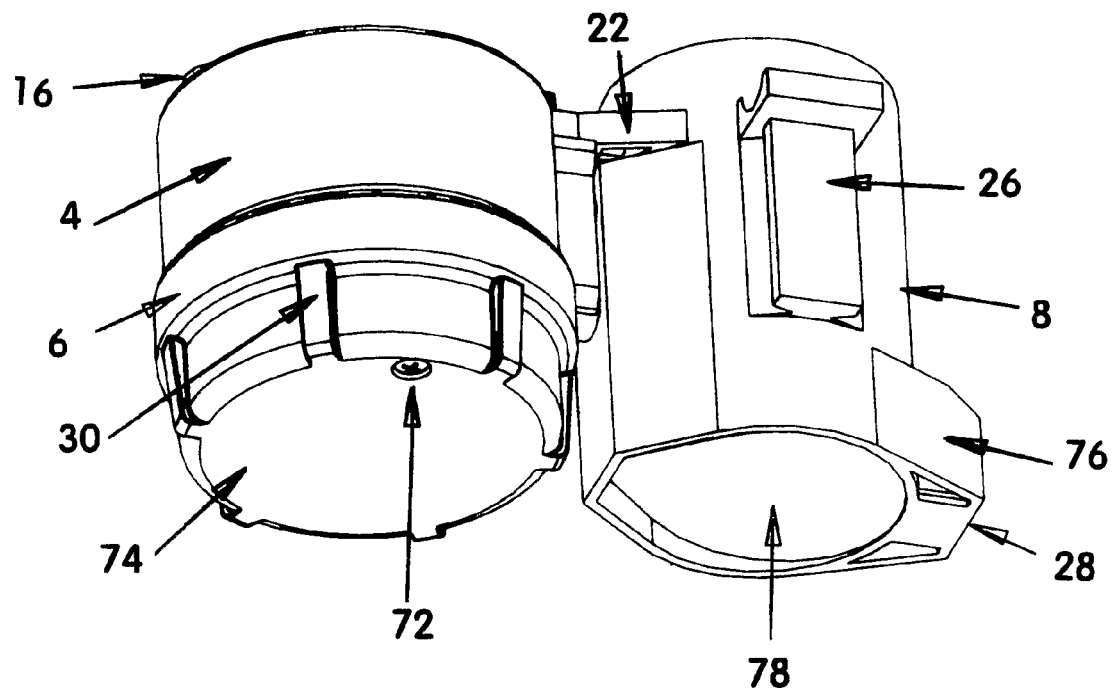
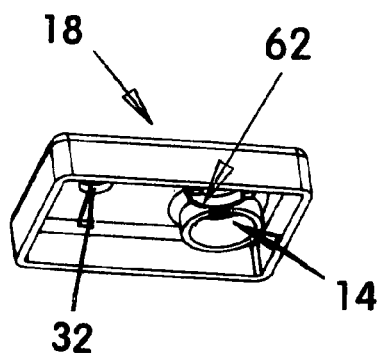
FIG. 7
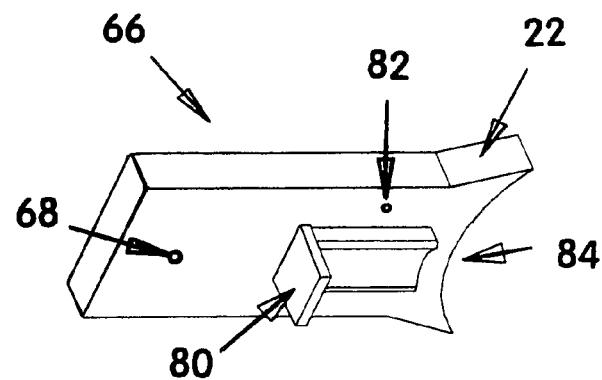
FIG. 8

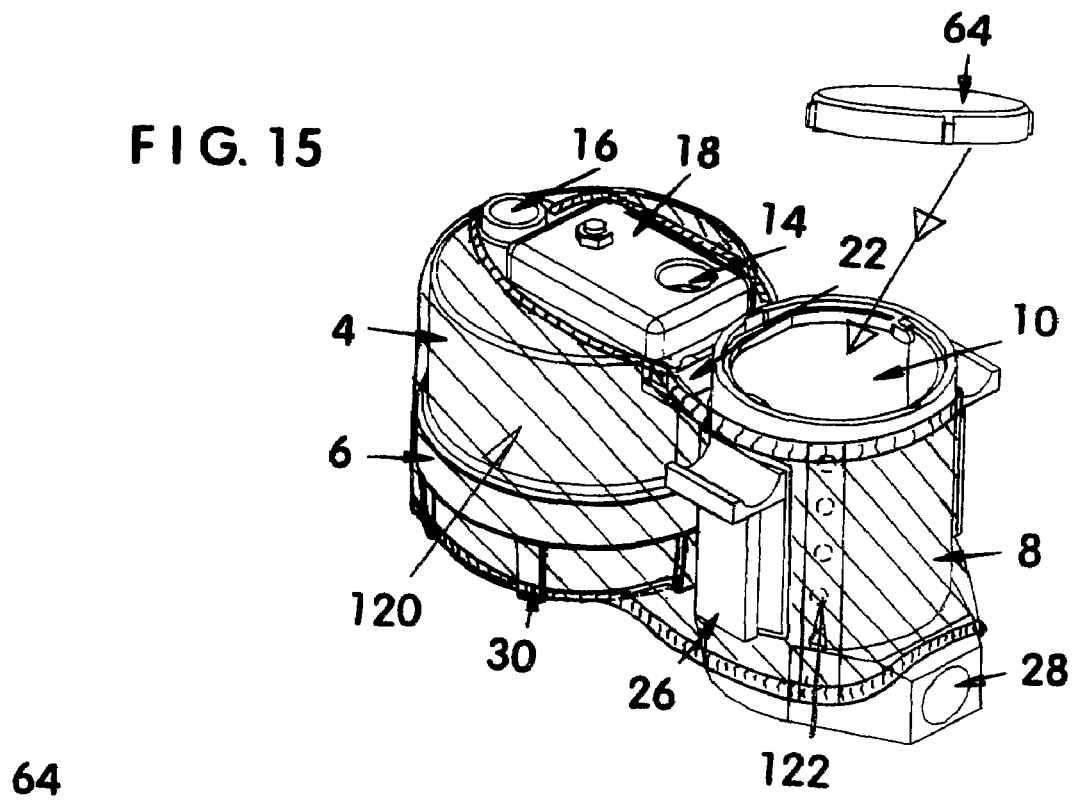
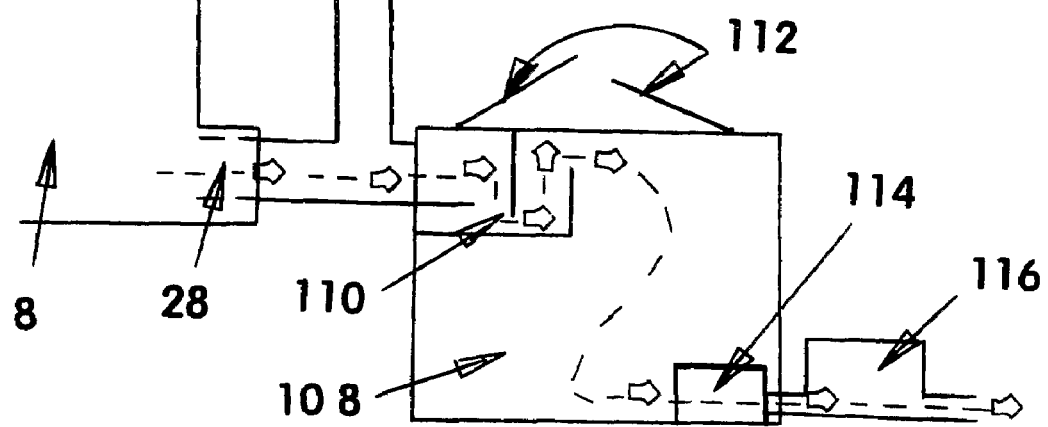

CONDENSATE RECOVERY AND TREATMENT SYSTEM

CROSS-REFERENCES TO RELATED APPLICATIONS

None

TECHNICAL FIELD

This invention relates to the field of recovery devices for water extracted from the atmosphere, specifically to a combination filter assembly unit and disinfection/sanitizing treatment chamber for use as a primarily gravity-assisted water saving system. It is contemplated for the filter assembly unit to be positioned upstream of the disinfection/sanitizing treatment chamber. The present invention can be connected between a condensate discharge tube, such as the discharge tube of an air conditioning system, and a receiving conduit used to divert the treated condensate for constructive use. Optionally, one or more additional treatment and/or safety devices may be connected between the disinfection/sanitizing treatment chamber and the receiving conduit, such as but not limited to charcoal filters, micron pore filters, holding tanks, and air venting apparatus. The filter assembly unit has a compact configuration and a connecting brace with a concave perimeter end that allows it to securely depend in a lateral direction from the outside surface of the cylindrical treatment chamber during use. A mounting bracket is then used to fix the treatment chamber against a solid surface, such as but not limited to an adjacent wall. In addition, the most preferred embodiment of the filter assembly unit has a removable bottom cover with a re-closable drain opening to facilitate maintenance, an inner structure having a combination p-trap and valve configuration that substantially reduces the likelihood of fumes and fluids from the disinfection/sanitizing treatment chamber backing through the filter assembly unit and entering the connected air conditioning or other system from which the condensate was originally derived, a pressure relief valve, a float ball switch that will shut off the associated air conditioning or other condensate producing system if the second elevated p-trap in the filter assembly becomes filled with condensate. The treatment chamber has an optional basket to hold disinfection/sanitizing tablets, with the basket and/or the interior bottom surface of the treatment chamber having a slanted and ridged bottom surface that delays travel of the condensate undergoing treatment to the discharge opening so as to allow sufficient exposure of the collected condensate to disinfection/sanitizing tablets and/or the fumes generated thereby to accomplish the proper level of sanitizing needed for the intended use. Applications can include, but are not limited to, replenishing water lost from swimming pools due to evaporation, providing water to fill toilets, and/or providing water for pressure washing, cleaning, and other gray water use, as well as collecting condensate for use as a drinking water source in areas where other supplies of drinking water are expensive, unsafe, and/or in limited supply.

BACKGROUND ART

Air conditioning condensate is a largely under-used resource. Typically it drips uncollected from the discharge pipe/tubing of an air conditioning system and undergoes evaporation after it is distributed on pavement or the ground. However, a significant amount of condensate is produced over time by air conditioning systems in both residential and commercial buildings. For example, depending upon the season, a 3 to 4 ton air conditioning unit can produce up to 12-15 gallons of condensate water per day, or approximately 1,600 to 2,400 gallons per year. If 5 million homes collected the produced condensate, approximately 8 to 12 billion gallons of water per year could be recovered, treated, and put to constructive use. For 5 to 6 ton air conditioning units, up to 17-21 gallons of condensate water per unit can be produced in a day, or approximately 2,500 to 3,500 gallons per year per air conditioning unit. With the use of reclaimed water being more urgently needed and commonly accepted for an ever increasing variety of non-potable and potable uses worldwide, it would be useful to have a compact, sturdy and durable, easy-to-install, easy-to-use, low maintenance, safe, efficient, cost effective, and gravity-assisted means by which to reclaim air conditioning and other condensates and divert them to a useful purpose. The present invention provides all of the above.

One device for gravity-assisted recovery and treatment of air conditioning condensate is the invention disclosed in U.S. Pat. No. 6,550,264 to Cantolino (2003). It has a treatment chamber configured for holding a stack of chlorine tablets used for treating swimming pool water, or the type of bleach tablet used for laundry purposes, and an external P-trap connected between its water inlet opening and the air conditioning system from which the recovered water is derived that is configured to prevent the corrosive treatment vapors released by such tablets from entering the associated air conditioning system. Ridges in the slanted bottom surface of the treatment chamber provide support for the tablets above the condensate as it flows toward the chamber's discharge opening. The condensate does not come into actual contact with the tablets. The ridges are positioned to laterally divert the condensate flow, to increase the amount of time that the condensate is exposed to the treatment vapors for effective elimination of algae, mold, bacteria, viruses, and other disease causing agents. The slanted bottom surface causes the condensate to continue to move toward the treatment chamber's discharge opening. In addition, a removable cap connected to the top of the treatment chamber serves several purposes. It allows convenient access to the chamber for introduction of new treatment tablets, it prevents the corrosive treatment vapors released from those tablets from inadvertently entering the atmosphere, and it also seals the treatment chamber from unwanted interference by children, adverse weather, pets, insects, rodents, vegetation, dirt and other debris, and the like. In contrast, the present invention uses a combination of internal p-traps and valves within a filter assembly unit secured to and positioned upstream of the treatment chamber to prevent treatment vapors and treated condensate from moving back into the system from which the condensate was originally collected, with its filter assembly also having a removable bottom cover with a re-closable drain opening and a removable top cover that together facilitate maintenance, a float switch as an additional precaution against reverse flow of treated condensate back through the filter assembly unit, and a pressure relief valve. Thus, the present invention is distinguishable from the invention disclosed in U.S. Pat. No. 6,550, 264 to Cantolino (2003). No other invention is known that has the same features and advantages as the present invention for condensate collection and treatment, and which allows currently discarded condensate to be reclaimed for a wide variety of useful purposes.

DISCLOSURE OF THE INVENTION

The primary object of this invention is to provide a condensate recovery and treatment system for use in association with an air conditioning system or other condensate producing systems, which safeguards the condensate producing system from back-flow of fluids and fumes, treats the condensate in a manner that is safe to operators and the surrounding environment, and efficiently diverts the condensate after treatment for constructive use. It is also an object of this invention to provide a condensate recovery and treatment system that has a sturdy construction, is compact in size, and is made from durable materials for extended use. A further object of this invention is to provide a condensate recovery and treatment system that can be promptly, easily, and securely installed. It is also an object of this invention to provide a condensate recovery and treatment system that has redundant protective means configured and positioned within the filter assembly unit to prevent sanitizing/disinfecting vapors in the treatment chamber from backing up and reaching the air conditioning system from which the condensate was derived. A further object of this invention is to provide a condensate recovery and treatment system with easy maintenance access for operators. It is a further object of this invention to provide a condensate recovery and treatment system that can be easily installed in new construction, as well as retrofitted to air conditioning systems in existing construction. It is also an object of this invention to provide a condensate recovery and treatment system that does not sweat when installed in an overhead position in an indoor maintenance area or garage.

As described herein, properly manufactured and used, the present invention is a combination filter assembly and sanitizing/disinfecting treatment chamber for use as a primarily gravity-assisted water recovery system that takes the bacteria-laden and algae-laden discharge from any condensate producing source, such as but not limited to the air-conditioning system in a residential or commercial building, and treats it with sanitizing vapors, or contact with a combination of vapors and vapor-producing tablets, so that it can be used for other applications, such as but not limited to swimming pool refill, cleaning, and toilet flushing, and even as drinking water in areas where other sources of potable water are limited. However, when the condensate treated by the present invention is used as potable water, additional filtration is recommended. The most preferred embodiment of the present invention has a compact and sturdy filter assembly housing with an internal structure that forms at least two internal P-traps. When two p-traps are used, the first one encountered by the condensate passing through the filter assembly housing would be the larger of the two p-traps that is formed in part by a removable cover connected to the bottom of the filter assembly housing. The second P-trap would be much smaller and positioned within the upper portion of the filter assembly housing immediately before the condensate travels into the adjacent sanitizing/disinfecting treatment chamber. The connecting brace attached between the filter assembly housing an the treatment chamber, as well as to the upper surface of the filter assembly housing, has a downwardly extending protuberance that forms one of the interior walls of the second P-trap structure. Between the two P-traps, the most preferred embodiment of the present invention also contains at least one float ball and valve seat combination whereby when the water level within the filter assembly unit is below the valve seat, gravity secures the float ball within the valve seat to block any treatment fumes from reaching the connected air conditioning system from which the condensate was collected, or other condensate source. Once the amount of collected condensate is sufficient to again lift the float ball, movement of collected condensate is again allowed to flow into the smaller elevated P-trap, and subsequently into the treatment chamber. The present invention filter assembly and treatment chamber combination is compact in construction with a housing typically made from plastic materials that are configured and manufactured for protecting its internal structure from corrosive treatment fumes, from potentially damaging contact with yard maintenance equipment, as well as premature failure due to deterioration brought about by exposure to weathering elements, such as the sun. Connection of the present invention between an air conditioning system and a discharge conduit requires minimal manpower and expense. The inlet opening through the top surface of the filter assembly housing is connected to the discharge tubing of an air conditioning or other condensate producing system. When there is a secondary condensate discharge line connected to an air conditioning system or other condensate producing system, the secondary condensate discharge line can be connected to an auxiliary opening in the top cover of the filter assembly housing. Since water typically flows from the secondary condensate discharge line when the primary line is clogged, the float switch in the present invention, which is electrically connected to the air conditioning or other condensate producing system, will shut off the system to slow and then stop the production of condensate when a predetermined amount of water enters the filter assembly housing through the auxiliary opening. At the option of the installer, either prior to or after the inlet and auxiliary openings of the filter assembly unit are placed into fluid communication with a condensate producing system, the discharge opening of the treatment chamber can be connected to a filtration unit, swimming pool, holding rank or reservoir, or other equipment intended for receiving the treated condensate and ultimately putting it to constructive use. If the present invention is installed in an overhead position in an indoor maintenance area or garage, an insulating wrap can be used around the filter assembly housing and treatment chamber to prevent it from sweating and dripping moisture onto objects positioned below. Since it is contemplated for the present invention to be secured to a stationary object or fixture during use, such as a wall, two mounting support appendages laterally depend in an opposed position to one another from the outside surface of the treatment chamber. When interfaced with a mounting bracket having a complementary notched/cutout configuration, the mounting bracket and appendage combination not only provide sturdy positioning for the present invention, but also, once the present invention is disconnected from the associated condensate discharge tube and receiving conduit, the preferred bracket and appendage configuration allow the filter assembly housing and treatment chamber combination to be promptly lifted in a vertical direction from its mounted position for maintenance, inspection, and/or replacement purposes. The use of additional mounting brackets to also secure the filter assembly housing is made unnecessary by the use of the connecting brace, which fixes the filter assembly housing securely to the treatment chamber. Further, the use of additional mounting brackets for the filter assembly unit is not desired as they could potentially interfere with the ease by which its bottom cover can be repeatedly removed as needed for inspection and/or cleaning. Maintenance for the present invention is easy, requiring only the periodic removal of the top and bottom covers of the filter assembly unit to look for any debris or other material in the bottom cover that could potentially block the flow of condensate through the filter assembly housing. Maintenance for the treatment chamber typically requires only the removal of the treatment chamber cap and/or basket for rapid introduction of replacement sanitizing/treatment tablets. The removable basket minimizes handling of sanitizing tablets during replacement and/or allows quick and easy monitoring of the current rate of tablet consumption. An openable drain hole in the bottom cover allows removal of untreated condensate from the filter assembly housing prior to maintenance access. Since the present invention filter assembly housing is small in size, it can be easily, promptly, and inexpensively installed with air conditioning systems in new construction, or retrofitted into existing construction, thereby making recovery of a previously wasted source of water possible at a low cost to the user.

While the description herein provides preferred embodiments of the present invention, it should not be used to limit its scope. For example, variations of the present invention, while not shown and described herein, can also be considered within the scope of the present invention, such as variations in the size of the float ball and valve seat used, as long as together they can effectively fulfill their fume blocking function; the type of connection means used to attach the removable top and bottom covers to the filter assembly housing; the optional use of an o-ring or gasket to provide a waterproof seal between the removable covers and the filter assembly housing; the cross-sectional configuration of the filter assembly housing; the height of the treatment chamber; the thickness of the internal and external walls in the filter assembly housing; the type of vapor-resistant material used to manufacture the filter assembly housing, treatment chamber, float ball, valve seat, removable cap, and removable cover; and the surface texture, markings, instructions, logos, and other characteristics of the outside portion of filter assembly housing. Thus, the scope of the present invention should be determined by the appended claims and their legal equivalents, rather than being limited to the examples given.

BRIEF DESCRIPTION OF DRAWINGS

FIG. 2 is a perspective side view of the most preferred embodiment of the basket contemplated for use with the present invention treatment chamber and its removable pivoting handle, with a single sanitizing/disinfecting tablet shown in broken lines within the basket.

FIG. 3 is a perspective bottom view of the basket in the most preferred embodiment of the present invention with its slanted bottom surface and the large alignment protrusion used for promptly orienting the slanted bottom in the needed position relative to the interior bottom surface of the treatment chamber.

FIG. 4 is a perspective front view of the mounting bracket used in most preferred embodiment of the present invention which is contemplated for sliding attachment with one of the mounting support appendages outwardly depending from the present invention treatment chamber and thereby when the mounting bracket is securely fixed to a support surface, such as but not limited to an adjacent wall, the mounting bracket is able to securely maintain the filter assembly housing and treatment chamber in a stationary position during use.

FIG. 6 is a perspective bottom view of the combined filter assembly and treatment chamber housing of the most preferred embodiment of the present invention with an openable drain hole in the bottom cover of the filter assembly.

FIG. 7 is a perspective bottom view of the top cover of the filter assembly in the most preferred embodiment of the present invention.

FIG. 8 is a perspective bottom view of the connecting brace in the most preferred embodiment of the present invention that is positioned to depend between the treatment chamber and the filter assembly unit, with the connecting brace having a concave distal end and a downwardly extending protrusion that is configured to form one wall of the second p-trap in the filter assembly unit.

FIG. 15 is a perspective view of the combined filter assembly housing and treatment chamber of the present invention being covered with insulating material.

FIG. 16 is a simplified schematic view of several optional components that can be placed in communication with the discharge opening of the present invention treatment chamber to provide backflow prevention as well as additional treatment of the sanitized/disinfected condensate.

BEST MODES FOR CARRYING OUT THE INVENTION

Figure 1:
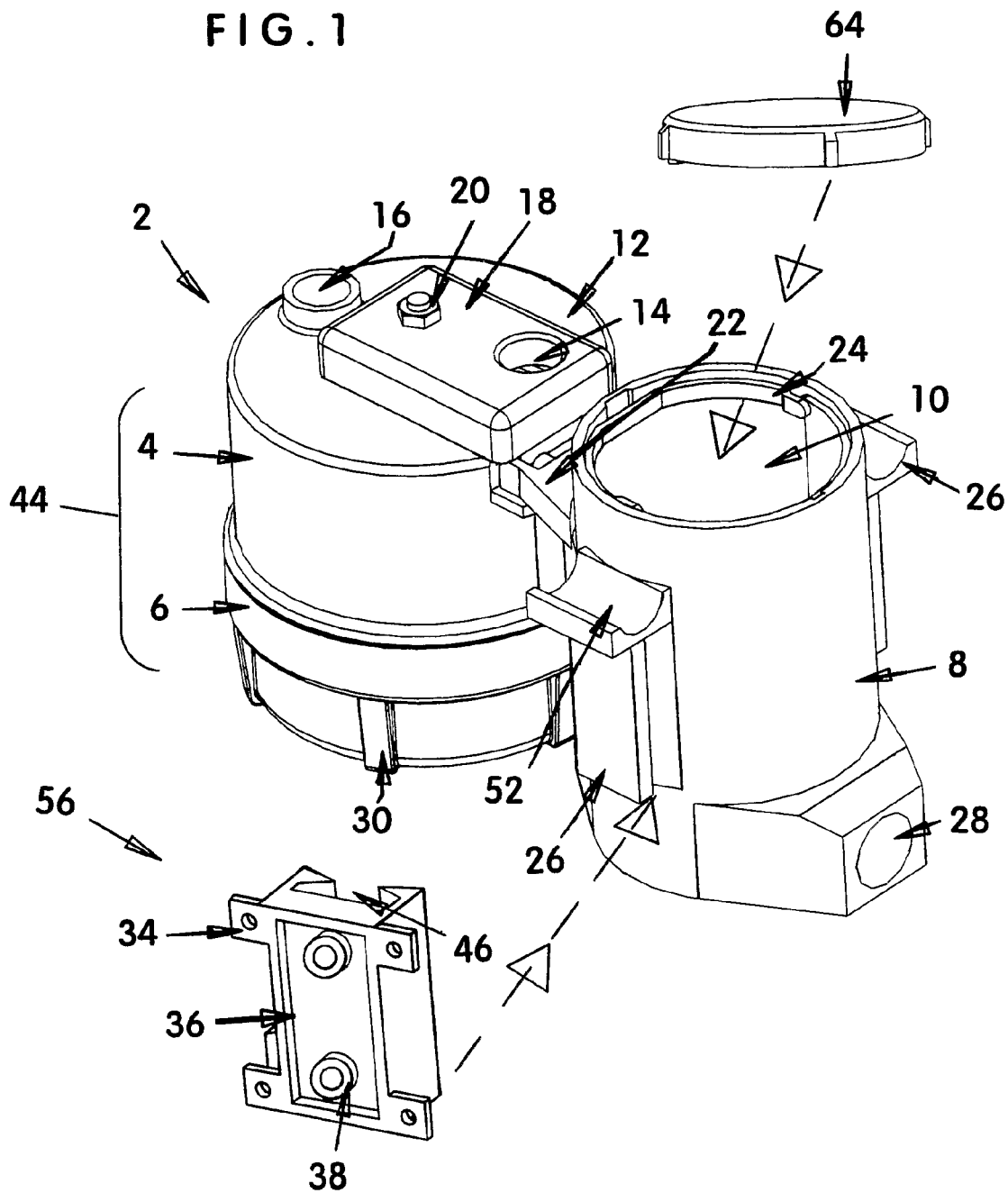
FIG. 1 is a perspective side view of the most preferred embodiment of the present invention having a cylindrical filter assembly housing with an upper inlet opening, a removable bottom cover with ridges that assist in its rotation/removal, a top cover with an auxiliary opening, and a connecting brace configured for use in securely positioning the filter assembly housing against an associated gravity-assisted condensate treatment chamber, with the treatment chamber also being shown having a lower discharge opening, a removable cap, an interior basket, and two laterally opposed mounting support appendages, with a mounting bracket positioned adjacent to one of the support appendages for use in securely fixing the combined filter assembly housing and treatment chamber to a stationary and sturdy support object during use.
Figure 9:
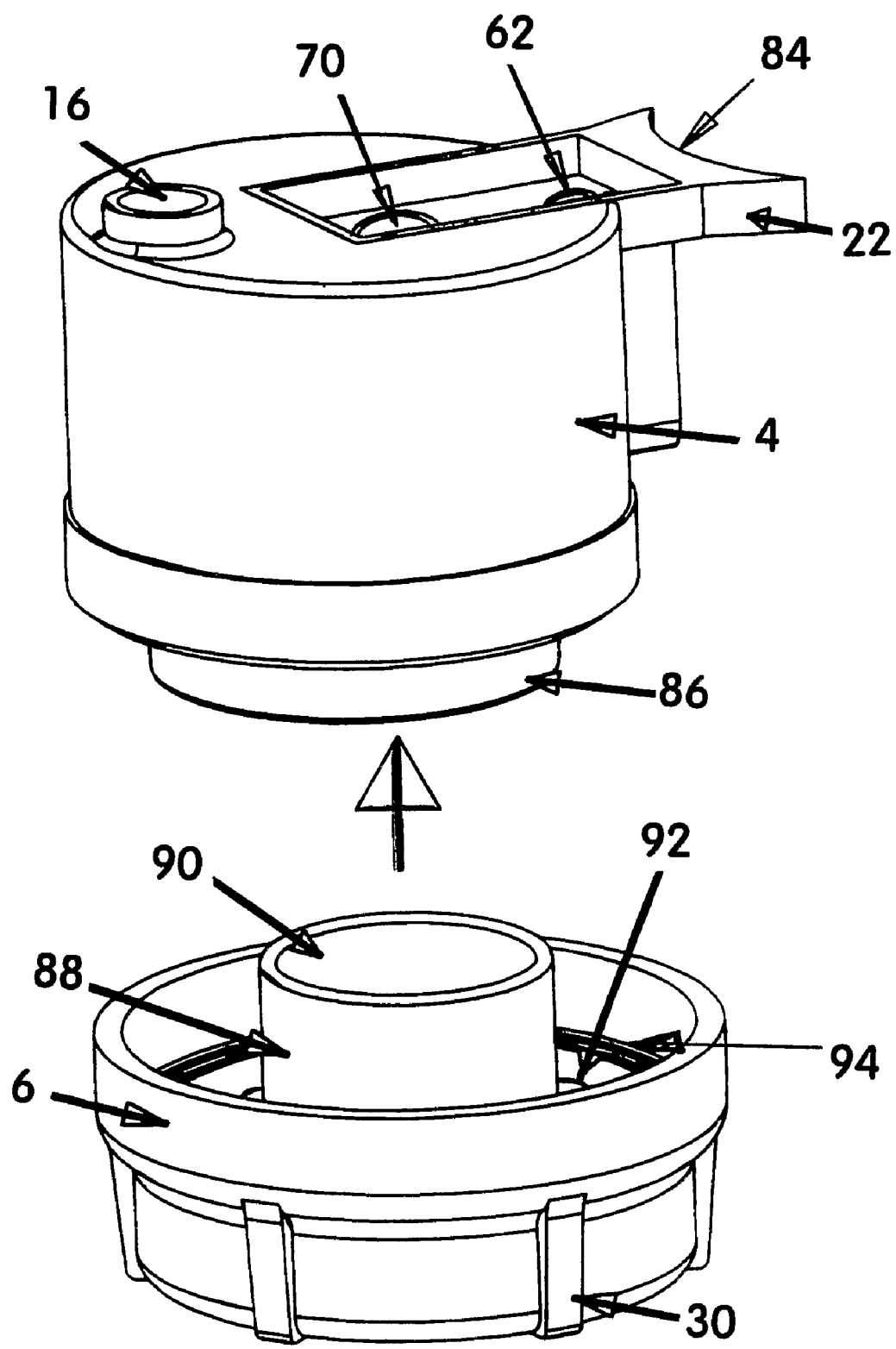
FIG. 9 is an exploded view of the most preferred embodiment of the present invention filter assembly housing with its associated bottom cover removed to reveal a threaded connection, as well as upwardly extending and downwardly extending internal components that create the walls of a first P-trap, with the connecting brace also attached in its usable position to the upper portion of the filter assembly.

FIGS. 1 and 5-8 show the most preferred embodiment 2 of the present invention having a treatment chamber 8 connected to and in fluid communication with a filter assembly unit 44 that comprises a filter assembly housing 4, a removable top cover 18, a removable bottom cover 6, and a connecting brace 66. Treatment chamber 8 has a discharge opening 28 positioned remotely from its connection to filter assembly unit 44, a removable cap 64, an interior basket 10 with a rotatable handle 24, and two opposing mounting support appendages 26 that laterally depend from opposing sides of its outer surface. Although not critical, it is preferred that mounting support appendages 26 be positioned perpendicular to the alignment of filter assembly housing 6 to treatment chamber 8. As shown in FIG. 9, it is contemplated for bottom cover 6 to have a threaded connection to the lower end of filter assembly housing 4, although other waterproof and removable connections are also considered to be within the scope of the present invention, including but not limited to a bayonet lock or clamping connection as long as the means used allows for easy and prompt maintenance access to housing 4. Further, although not shown, an o-ring or other gasket means can be used to secure the threaded connection between filter assembly housing 4 and bottom cover 6, as needed. In addition, bottom cover 6 has a plurality of ridges 30 that assist a user in rotating bottom cover 6 during its removal and reattachment. The size, number, configuration, and spacing of ridges 30 is not critical as long as they are able to fulfill their rotation-assisting function. FIG. 6 further shows a re-closable drain hole 72 through bottom cover 6, which is used to evacuate collected condensate from bottom cover 6 and avoid spilled condensate, particularly when preferred embodiment 2 is installed in an overhead position in an indoor maintenance area or garage. The number of drain holes 72 is not critical, however, for most applications one drain hole 72 is considered sufficient. FIG. 3 shows a float switch 118 being installed within the upper portion of filter housing assembly 4, with FIG. 1 showing float switch 118 being protected from outside interferences by top cover 18. Since the flow of condensate (not shown) through most preferred embodiment 2 is primarily gravity-assisted, it is contemplated for filter assembly unit 44 to be connected to the condensate discharge tube of the condensate producing system (not shown), upstream from treatment chamber 8. The main connection between the condensate discharge tube and filter assembly housing 4 is via inlet opening 16, and although not shown it is contemplated that the condensate discharge tube can be directly connected to inlet opening 16 or via a quick-disconnect type of waterproof fitting. Similarly, the discharge opening 28 in treatment chamber 8 can be directly connected to a receiving conduit or via a quick-disconnect type of waterproof fitting (not shown). The size, configuration, and exact location of inlet opening 16 are not critical, although cost considerations dictate a size and configuration that are easily connected to standard sizes of plumbing hardware.

Figure 5:
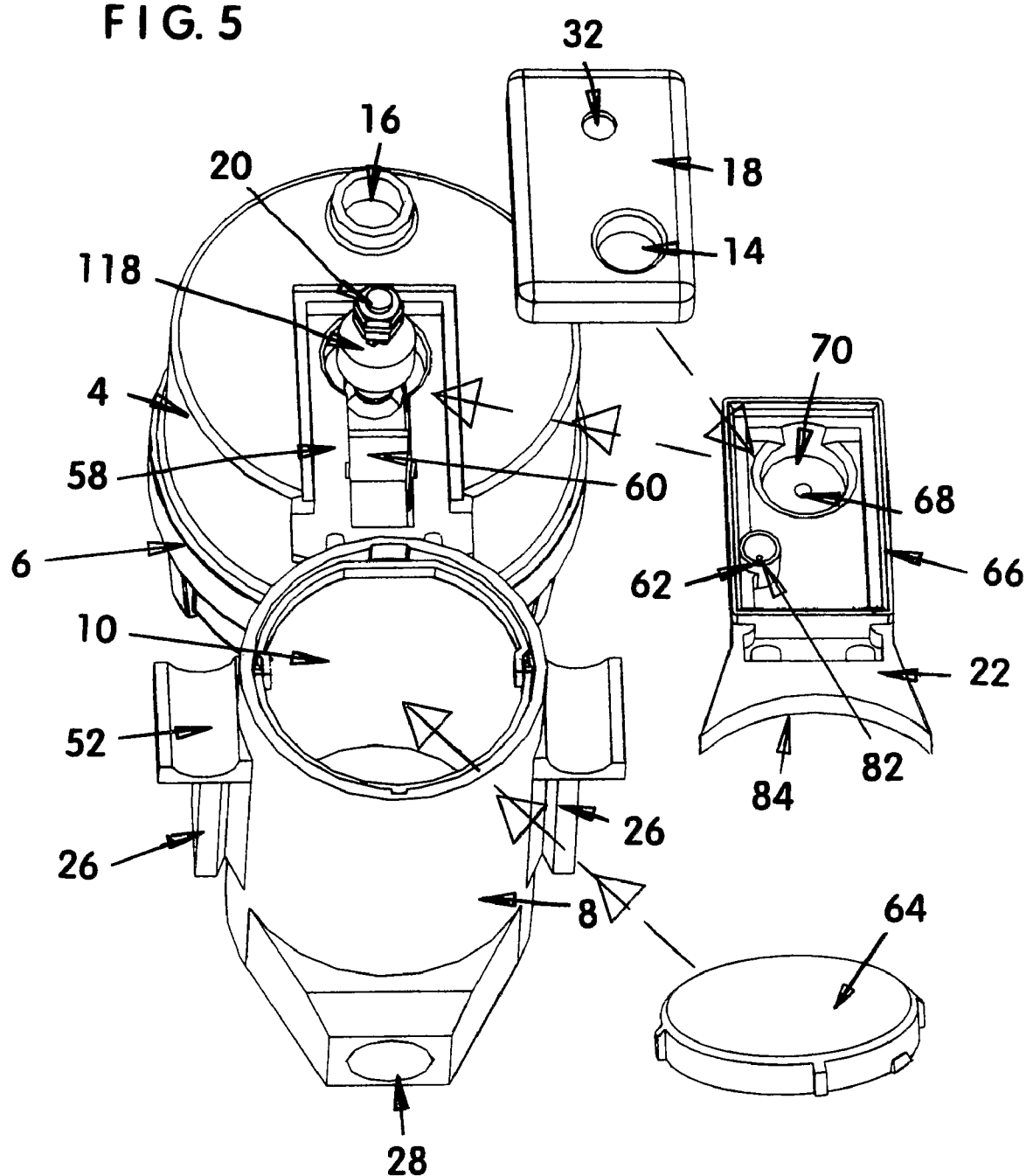
FIG. 5 is a perspective top view of the most preferred embodiment of the present invention with the connecting brace and top cover of the filter assembly housing removed, the discharge opening in the treatment chamber positioned remotely from the filter assembly housing, the treatment chamber cap removed to reveal a basket configured for containing sanitizing/disinfecting tablets, and opposed mounting support appendages on the outside surface of the treatment chamber that in combination with a complementary mounting bracket are used to securely fix the combined filter assembly housing and treatment chamber to a stationary and sturdy support object during use.

Although not shown in detail in FIGS. 1 and 5-8, filter assembly unit 44 has two internal p-traps separated by a float ball (shown in FIG. 12 by the number 40) and valve seat (shown in FIG. 12 by the number 42), to minimize reverse travel of potentially corrosive fumes and prevent them from reaching the system producing condensate being treated by the present invention. The combined internal structure of filter assembly housing 4 and bottom cover 6 makes up the first p-trap encountered by condensate entering filter assembly unit 44. The second p-trap is smaller and elevated relative to the first p-trap, with the second p-trap being formed from the upward extending interior wall 60 shown in FIG. 3, in combination with the downwardly extending wall member 80 depending from the bottom surface of connecting brace 66. Most preferred embodiment also comprises several safety features, such as a pressure relief valve 62 with a vent opening 82 that is normally covered by a float ball (not shown but similar to float ball 40 and small enough to move freely within the interior space of valve 62). Valve 62 can be configured as a part of connecting brace 66 (as shown in FIG. 5) or as a part of top cover 18 (as shown in FIG. 7). As a further safety feature, top cover 18 comprises an auxiliary opening 14 that can be used to connect a second condensate discharge tube, when present. In some areas two condensate discharge tubes are used, with the second one providing a back-up outflow means for transporting accumulating condensate away from the system producing it, should the first discharge tube become clogged for any reason. Auxiliary opening 14 transports condensate into the second p-trap. Float switch 118 is used with the second p-trap and auxiliary opening 14 so that when a predetermined maximum desired amount of condensate entering the second p-trap is exceeded, the float switch that is connected electrically to the associated system producing the condensate will automatically be turned off and avoid the risk of overflow problems. Float switch 118 is mounted on the shaft of a threaded fastener 20 that is secured on its threaded end to top cover 18. The other end of fastener 20 extends through the bore 68 in the bottom of the recess 70 in horizontally-extending connecting brace 66 so as to allow free and responsive movement of float switch 118 within recess 70. FIGS. 7 and 8 show the upper opening 32 in top cover 18 and the bore 68 through connecting brace 66 between which float switch 118 is positioned for use.

In addition to the other features previously mentioned, FIG. 1 also shows cap 64 having a configuration with shallow depth dimension and a plurality of ridges, which although they are not marked with the number 30 are similar in rotation-assisting function to the ridges 30 outwardly depending from bottom cover 6. While not shown, cap 64 may have a threaded or other secure connection to the upper end of treatment chamber 8 to prevent discharge of potentially corrosive sanitizing/disinfecting fumes (not shown) from being released into the surrounding environment. Cap 64 also prevents dust, insects, rodents, and other unwanted items from entering treatment chamber 8. FIG. 1 further shows the mounting bracket 56 that is contemplated in most preferred embodiment 2 for attaching treatment chamber to a stationary support, such as but not limited to an adjacent wall. The cutout configuration 46 through the front surface of mounting bracket 56 (shown more clearly in FIG. 4) complements the configuration of the lower portion of both mounting support appendages outwardly depending laterally from the outer surface of treatment chamber 8. Once mounting bracket 56 is secured to a wall or other surface (not shown) via the large central fastener openings 38 or the smaller openings on tabs 34 (also identified by the number 38 in FIG. 4), one of the appendages 26 can be vertically lowered into cutout configuration 46. Additional mounting brackets 56 are not required to secure filter housing assembly 4, as the concave perimeter edge 84 on the distal end 22 of connecting brace 66 firmly fixes filter assembly housing 4 and treatment chamber 8 to one another. The size, number, configuration, and location of tabs 34 and fasteners openings 38 are not critical. Also, the cutout configuration 46 shown in FIG. 4 is not critical for present invention use, and it is contemplated for configurations other than that shown in FIG. 4 to be used. To maintain leak-proof fluid communication between filter assembly housing 4 and treatment chamber 8, in most applications connecting brace 66 would not be removable from filter assembly housing 4 or treatment chamber 8. The concave upper surface 52 of appendages 26 can be used to support of conduit, if needed. It is critical that the upper portion of appendages 26, containing concave upper surface 52, extend beyond the lower portion of appendages 26 so that the overlapping upper portion will act as a stop for the upper surface of mounting bracket 56. Two appendages 26 are used, so that both left-handed and right-handed installation of most preferred embodiment can be achieved, as dictated by the location and so that filter assembly housing 4 is positioned upstream of treatment chamber 8. While the indentation 36 shown in the back of mounting bracket 56 saves material cost during manufacture, it can also be used with gasket or other resilient materials to provide secure fastening of mounting bracket 56 against uneven surfaces (not shown).

Figure 10:
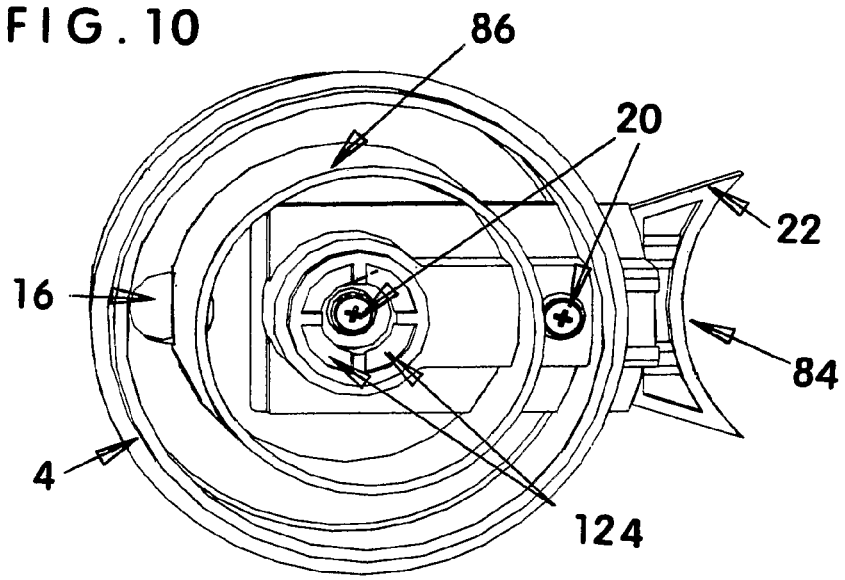
FIG. 10 is a bottom view of the filter assembly housing in the most preferred embodiment of the present invention with its bottom cover removed, the connecting brace secured in its usable position, and the two fasteners that are used to secure the connecting brace and the top cover in their usable positions.
Figure 11:
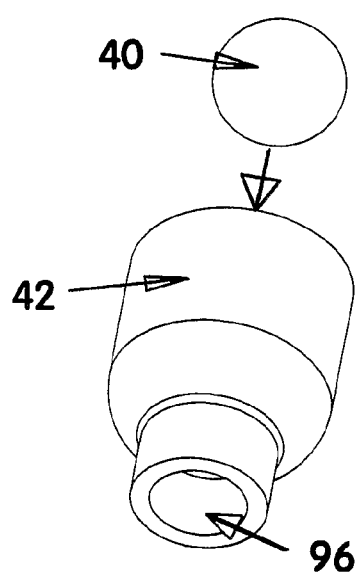
FIG. 11 is a perspective view of the float ball and valve seat combination used in filter assembly of the most preferred embodiment of the present invention.
Figure 12:
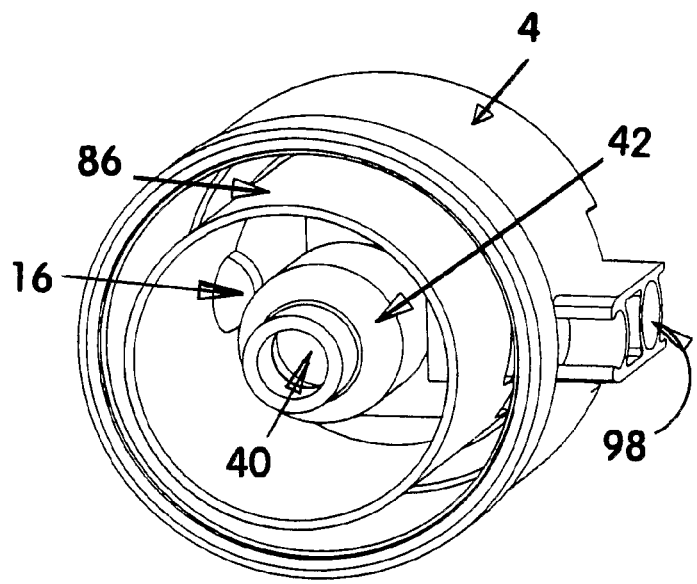
FIG. 12 is a bottom view of the filter assembly housing in the most preferred embodiment of the present invention with its bottom cover removed and the float ball and valve seat centrally positioned within the housing and also in a concentric position relative to the downwardly-extending cylindrically-shaped internal wall structure.
Figure 13:
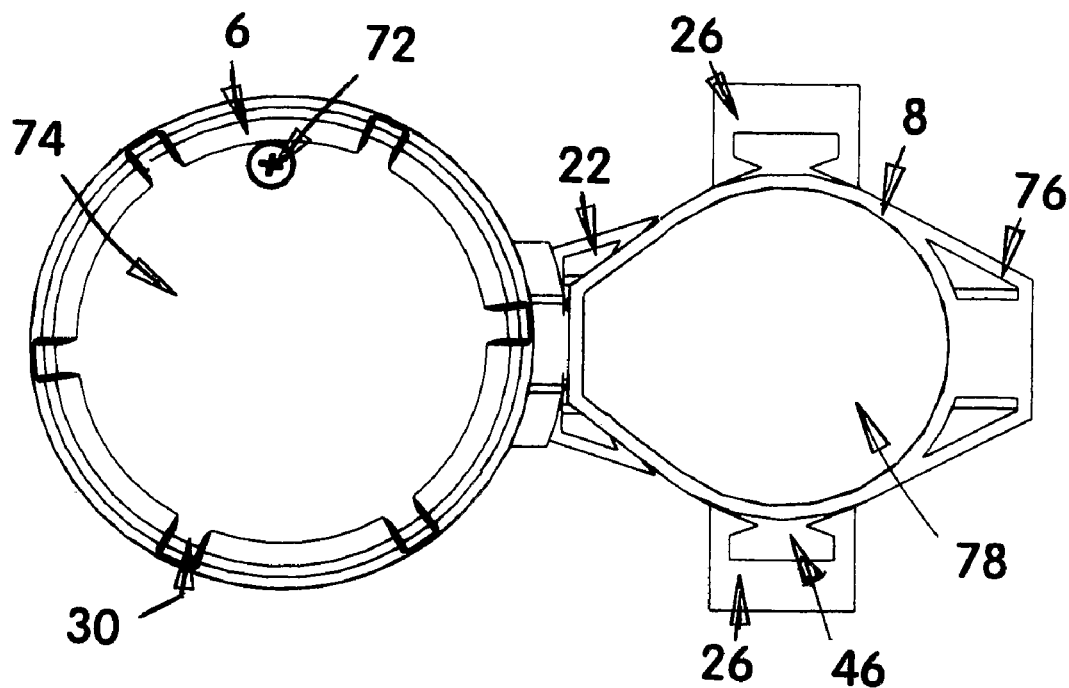
FIG. 13 is a bottom view of the combined filter assembly housing and treatment chamber in the most preferred embodiment of the present invention, the connecting brace between them, the drain opening in the bottom cover of the filter assembly unit, and the opposed mounting support appendages that are used for securely fixing the treatment chamber to a stationary and sturdy support object during use.

FIGS. 2 and 3 show the basket 10 used with most preferred embodiment 2. It has a slanted and perforated bottom surface 104, that permits sanitizing/disinfecting fumes (not shown) released from tablets 32 positioned within basket 10 to come in contact with condensate passing through treatment chamber 8. When flow of condensate through treatment chamber increases or when otherwise needed for an application, perforated bottom surface 104 also allows condensate to come into direct contact with sanitizing/disinfecting tablets 32. FIG. 2 also shows that the handle 24 of basket 10 is pivotally attached thereto, to allow a compact configuration for secure connection of cap 64 to the upper end of treatment chamber 8. Although FIG. 2 shows a single sanitizing/disinfecting tablet 32 in broken lines within basket 10, the height of basket 10 and treatment chamber 8 are variable and can be made to accommodate several tablets. Although not limited thereto, in most applications it is contemplated that one to six tablets 32 at a time would be used, with more tablets being used to increase the time needed between successive maintenance and/or inspection visits. FIG. 2 also shows the large protrusion 50 and the small protrusion 54 that are used together for expedited alignment of slanted bottom surface 104 within treatment chamber 8 so that as condensate passes through treatment chamber 8 it is always positioned close to sanitizing/disinfecting fumes for the desired treatment effect. Further, FIG. 13 shows the bottom surface 74 of bottom cover 6 and the bottom exterior surface 78 of treatment chamber 8 being substantially unadorned. Although from FIGS. 6 and 9 one can see that it is contemplated for the exterior bottom surface 74 of bottom cover 6 to be substantially planar and horizontally extending, the bottom exterior surface 78 of treatment chamber 8 may be planar and horizontally extending, or inclined. FIG. 13 also shows the preferred cutout configuration 46 on mounting support appendages 26. While the exterior bottom surface 74 of bottom cover 6 and the bottom exterior surface 78 of treatment chamber 8 are shown to be unadorned, either may be textured, have marked indicia thereon such as but not limited to product source information or instructions for assembly and/or use, have one or more concentric rings downwardly depending therefrom if needed to raise the height of discharge opening 28 for a simpler and more direct connection to a receiving conduit, or have another change from that shown which provides aesthetic or functional advantage while still promoting a stable positioning for filter assembly housing 4 relative to treatment chamber 8. FIGS. 9-12 show the internal structure of the filter housing assembly 4 and bottom cover 6 that form the first p-trap encountered by the condensate after it enters inlet opening 16. The first p-trap is formed by the interior wall of filter assembly housing 4, the interior wall of bottom cover 6, the interior bottom surface 92 of bottom cover 6, the downwardly-extending inner wall 86 (shown in FIGS. 9, 10, and 12), as well as the upwardly-extending central wall 88. When bottom cover 6 is connected to filter assembly housing 4, upwardly-extending central wall 88 is positioned concentrically between the valve seat 42 and the downwardly-extending inner wall 86 shown in FIG. 12. Inlet opening 16 does not communicate with the upper opening 90 formed by upwardly-extending central wall 88 and into which valve seat 42 downwardly extends. Although not shown, a plurality of fins may be provided that help to maintain float ball 40 in an optimum aligned position relative to valve seat 42 for failure-proof operation. FIG. 10 also shows two fasteners 20 being used with filter assembly housing 4, the leftmost fastener 20 being used to securely fix top cover 18 to the top surface 12 of filter assembly housing 4, as well as to support float switch 118 for vertical movement. The leftmost fastener 20 is used for attachment of connecting brace 66 to filter assembly housing 4. Although not shown, additional adhesive, bonding, and/or other attachment means can be used to securely fix connecting brace 66 to filter assembly housing 4 and/or the outer surface of treatment chamber 8. In addition, FIG. 12 shows the discharge opening 98 through which condensate accumulated in filter assembly unit 44 travels to treatment chamber 8. The configuration and positioning of discharge opening 98 shown is preferred to optimize the operation and location of the second p-trap within filter assembly housing 4, Although the most preferred embodiment contemplates the use of two p-traps separated from one another by a float ball 40 and valve seat 42, as shown and described herein, when applications necessitate, it is also contemplated for the present invention to include additional back-up prevention measures, in the form of one or more additional valves and/or additional internal or external p-traps. FIG. 11 shows the bore 96 in the lower end of valve seat 42 through which collected condensate travels to unseat float ball 40, which then allows the collected condensate to flow into the second P-trap in the upper portion of filter assembly housing 4. Until forced away from valve seat 42 by the accumulation of collected condensate within the first P-trap in filter assembly housing 4, gravity forces float ball 40 into the interior space within valve seat 42 so that float ball 40 covers bore 96 and prevents back-flow of treated condensate through the first P-trap and into the associated air conditioning or other condensate producing system (not shown) from which the condensate is collected. The cross-sectional inside dimension of valve seat 42 should not be significantly larger that the diameter dimension of float ball 40, so that when conduit flow through the second elevated P-trap has ceased, float ball 40 will always seek a centered position within valve seat 42 over bore 96 to block it.

Figure 14:
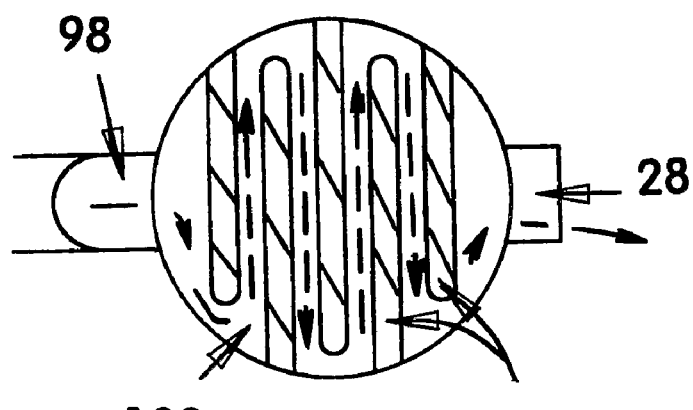
FIG. 14 is a top view of the pattern of ridges in the inside bottom surface of the treatment chamber of the most preferred embodiment of the present invention that is configured to delay travel of the collected condensate through the treatment chamber for extended exposure to sanitizing/disinfecting tablets and/or fumes.

FIG. 14 shows the preferred pattern of ridges 102 in the inside bottom surface 100 of treatment chamber 8 that is configured to delay travel of the collected condensate through treatment chamber 8 for extended exposure to sanitizing/disinfecting tablets 32 and/or fumes. Since the present invention is gravity-assisted, it is contemplated for inside bottom surface 100 to be inclined. The number 98 in FIG. 13 represents the discharge opening in filter assembly housing 4, while the number 8 in FIG. 13 represents the corresponding discharge opening in treatment chamber 8. As a result of the present invention being gravity-assisted, it is critical that discharge opening 98 have an elevated positioning relative to the discharge opening 28 in treatment chamber 8. Also, any number of ridges 100 can be used, and ridges 102 can have any dimension, spacing, and/or configuration (blunt, angled, arcuate, or other) that allows the condensate to receive the desired amount of sanitizing/disinfecting treatment. FIG. 15 shows a thermally insulating wrap 120 that may be optionally and removably placed around filter assembly housing 4, bottom cover 6, and treatment chamber 8 to prevent or at least minimize the formation of dew point moisture on the outside surfaces of filter assembly housing 4, bottom cover 6, and treatment chamber 8. Although not shown, when filter assembly housing 4, bottom cover 6, and treatment chamber 8 are installed in an overhead position, it is contemplated for insulating wrap 120 to also extend across the exterior bottom surface 74 of bottom cover 6 and the bottom exterior surface 78 of treatment chamber 8. It is contemplated for insulating wrap 120 to be configured so that inlet opening 16, discharge opening 28, and the two mounting support appendages 26 are exposed for installation use. For minimal production cost and effective use, it is contemplated that insulating wrap 120 be configured to closely conform to the outer perimeters of filter assembly housing 4, bottom cover 6, and treatment chamber 8. Although not critical, as an optional feature or where indicated by the application, it is contemplated that the upper and lower edges of insulating wrap 120 may be stretchable, stiffened, and/or weighted. Further, quick-release fasteners 122 may be used for easy and prompt removal of insulating wrap 120 for maintenance, inspection, and/or replacement of filter assembly housing 4, bottom cover 6, and/or treatment chamber 8. Although not limited thereto it is contemplated for quick-release fasteners 122 to include hook-and-loop fasteners, one or more zippers, snaps, hooks, and/or a combination thereof. Insulating wrap 120, as well as filter assembly unit 44 and treatment chamber 8 can be made from clear to opaque materials. When transparent materials are used, blockages can be viewed prior to maintenance access.

In simplified schematic form, FIG. 16 shows several optional components that can be placed in communication with discharge opening 28 of the present invention treatment chamber 8 to provide backflow prevention as well as additional treatment of the sanitized/disinfected condensate after it leaves treatment chamber 8. In FIG. 16 condensate flow is indicated by hollow arrows separated by broken lines. FIG. 16 shows a vertically extending pressure relief valve and vent 106 immediately downstream from discharge opening 28. It is preferred that pressure relief valve and vent 106 have a simple ball valve 40 in combination with an upper configuration and/or cover or cap having small openings that are positioned to vent in a downwardly direction. In addition, if required by the application, a holding tank 108 could also be connected downstream from discharge opening 28. Although the size and configuration could be variable, it is contemplated that at least one p-trap 110 would be positioned between holding tank 108 and discharge opening 28. As an option, holding tank 108 could have upper doors 112 or other means for gaining access to the interior of holding tank 108, for pump inspection and/or maintenance, tank cleaning, and/or condensate testing purposes, or any other needed purpose. Further, in the alternative or in addition thereto, a filter assembly 116 could be connected downstream from discharge opening 28 and include charcoal filtering apparatus, micron filters, alone or in combination with each other or other filtering means appropriate to the intended application. Other technology, such as but not limited heat or UV light treatment, could also be connected downstream from discharge opening 28 to bring the condensate leaving treatment chamber 8 up to any standard needed for an intended application.

Should the outer surface of the sanitizing/treatment chamber 8 selected for use with most preferred embodiment 2 have an outer surface configuration other than cylindrical, the configuration of distal end 22 of connecting brace 66 would be modified during manufacture to complement it. Also, the size of filter assembly housing 4 can be varied according to size of the associated air conditioning system from which it will collect condensate so as to allow continued flow of condensate through treatment chamber 8 and an optimum amount of exposure time of the condensate to the vapors released from the tablets 32 in treatment chamber 8. Further, although the accompanying illustrations show inlet opening 16 being positioned through the top surface 12 of filter assembly housing 4, in a position remote from discharge opening 28, such positioning for inlet opening 16 is not critical and could vary according to the internal P-trap structure of filter assembly housing 4. Further, the diameters of inlet opening 16 and discharge opening 28, relative to one another and filter assembly housing 4, may vary from that shown in the accompanying illustrations as long as the means of connection for inlet opening 16 to the condensate discharge pipe (not shown) of an air conditioning or other condensate producing system and for the connection of discharge opening 28 to a receiving conduit (not shown) remains simple and expedient. To reduce maintenance during use of preferred embodiment 2, filter assembly housing 4, bottom cover 6, connecting brace 66, and treatment chamber 8 would all be made from sturdy corrosion-resistant materials that would also be configured for protection against premature deterioration from weathering elements, such as the sun. Further, the configuration of connecting brace 66 is not critical and may be varied from that shown.

Although the internal structure of treatment chamber 8 is not shown, typically to use the present invention, a user would place at least one sanitizing fume-producing tablet 32 within treatment chamber 8. A removable basket 10 may be used within treatment chamber 8 to more conveniently introduce tablets into the required position above the inclined bottom surface 100 of treatment chamber 8 where the collected condensate travels during exposure to the treatment fumes. Under routine operation, one or two tablets will permit annual refill maintenance. The basket 10 or bottommost tablet 32 sits upon a series of laterally-extending ridges 102 on the inclined bottom surface 100 between which the condensate flows while being sanitized. The filter assembly housing 4 collects the condensate prior to its transfer to the treatment chamber 8 and exposure to the sanitizing fumes. The condensate leaving the discharge pipe of the condensate producing system first enters the present invention via inlet opening 16. Gravity draws the condensate directly to the bottom surface 92 of bottom cover 6. The wall 86 downwardly extending from filter assembly housing 4 does not extend all the way to bottom surface 92 when housing 4 and bottom cover 6 are joined. The collected condensate accumulates within bottom cover 6 until a sufficient amount is obtained for some of it to spill over into the central opening 90 within the cylindrical internal wall structure 88 that upwardly extends from bottom surface 92 and into which valve seat 42 is suspended. Float ball 40 is positioned within valve seat 42, until sufficient condensate accumulates and flows through the bottom opening 96 in valve seat 42, and then forces float ball 40 upward and away from valve seat 42 so as to allow the condensate to eventually move upwardly and into the elevated second P-trap of filter assembly housing 4. Once a sufficient amount of condensate moves through access openings 124 so that it spills over upwardly extending wall 60, the condensate moves under downwardly extending wall 80, across the deep central bottom surface of recess 58. In the most preferred embodiment of the present invention, the sanitizing fumes released by the tablets 32 in treatment chamber 8 are prevented from reaching the condensate producing system, since the fumes would be dissolved by the condensate accumulated in the P-traps within filter assembly housing 4, and if the amount of condensate within filet assembly housing 4 is low, float ball 40 would be firmly seated by gravity against valve seat 42 to prevent fumes from traveling through its bottom opening 96. Once the condensate travels between the ridges 102 upon the inclined bottom surface 100 of the treatment chamber 8, it is released through discharge assembly 76 for a useful application.

INDUSTRIAL APPLICABILITY

Air conditioning condensate is a largely unused resource. Typically it drips uncollected from the discharge pipe/tubing of an air conditioning system and undergoes evaporation after it is distributed on pavement or the ground. However, a significant amount of condensate is produced over time by air conditioning systems in both residential and commercial buildings. The present invention is a combination filter assembly unit and disinfection/sanitizing treatment chamber for use as a primarily gravity-assisted water saving system, which is configured to collect this typically discarded resource, treat it, and release it for constructive use. It is connected between the condensate discharge tube of an air conditioning system, or other condensate producing systems, and a receiving conduit, wherein it is contemplated for the filter assembly unit to be positioned upstream of the disinfection/sanitizing treatment chamber. Optionally, one or more additional treatment and/or safety devices may be connected between the disinfection/sanitizing treatment chamber and the receiving conduit, such as but not limited to charcoal filters, micron pore filters, holding tanks, and pressure relief valves. Although many applications involve replenishment of swimming pool water lost due to evaporation, the providing of water to fill toilets, and the providing of water for cleaning or pressure washing, in areas where other supplies of drinking water are expensive, unsafe, and/or in limited supply the present invention could be used to collect and treat condensate for use as potable water. The filter assembly unit has redundant structure to protect the system from which the condensate is received. In addition, the most preferred embodiment of the filter assembly unit has a removable bottom cover with a re-closable drain opening to facilitate maintenance and a float switch that will shut off the associated air conditioning or other condensate producing system if the second elevated internal p-trap within the filter assembly housing becomes filled with condensate beyond a predetermined acceptable level. With the use of reclaimed water being more urgently needed and commonly accepted for an ever increasing variety of non-potable and potable uses worldwide, it would be useful to have an invention such as the present invention water preserving system that is compact, sturdy and durable, easy-to-install, easy-to-use, low maintenance, safe, efficient, and a cost effective means by which to reclaim air conditioning and other condensates and divert them to a useful purpose.

I claim:

1. A condensate recovery and treatment system that sanitizes condensate collected from an associated condensate producing system by use of dissolvable tablets capable of releasing sanitizing vapors, including those used for treating swimming pool water and laundering purposes, while blocking return travel of treated condensate and vapors to the system from which it was derived, said recovery and treatment system comprising:
   a filter assembly housing having a bottom end, a fluid inlet opening, and a fluid discharge opening, said fluid discharge opening being positioned lower in height than said inlet opening for gravity-assisted fluid flow from said inlet opening to said discharge opening,
   a removable bottom cover having a leak-proof connection to said bottom end of said filter assembly housing, with said bottom cover and said filter assembly housing in combination having internal structure providing vapor-blocking means that is selected from a group consisting of P-traps, valves and valve seats, float balls and valve seats;
   a treatment chamber configured for containing dissolvable tablets capable of releasing sanitizing vapors, with said treatment chamber in fluid communication with said filter assembly housing and having a discharge opening;
   a connecting brace configured for securely fixing said housing against said treatment chamber, for forming a portion of one of said p-traps, and with pressure relief means; and
   a removable top cover configured to extend over a large portion of said connecting brace and said pressure relief means.

2. The recovery and treatment system of claim 1 characterized by said filter assembly housing also having an outer wall and a downwardly extending inner wall at a spaced-apart distance from said outer wall, and said inner wail extending beyond said bottom end of said housing to form a portion of one said P-trap.

3. The recovery and treatment system of claim 2 characterized by said bottom cover having an upwardly extending inner wall member and said inner wall member being positioned within said downwardly extending inner wall of said filter assembly housing when said filter assembly housing and said bottom cover are joined, and said upwardly extending inner wall member forming a portion of the same said P-trap containing said downwardly extending inner wall of said housing.

4. The recovery and treatment system of claim 1 characterized by said bottom cover having an upwardly extending inner wall member and said inner wall member forming a portion of one said P-trap.

5. The recovery and treatment system of claim 1 characterized by said bottom cover having a re-closable drain hole adapted to facilitate maintenance access to said filter housing assembly.

6. The recovery and treatment system of claim 1 characterized by said bottom cover having at least one external ridge configured for assistance in hand rotation of said bottom cover during removal from or attachment of said bottom cover to said filter assembly housing.

7. The recovery and treatment system of claim 1 characterized by said system further comprising an auxiliary inlet opening through said top cover of said filter assembly housing that is adapted for use when the condensate producing system has a primary condensate collecting tube and a secondary condensate collecting tube that functions to move condensate away from the system producing it when the primary condensate collecting tube becomes blocked, and said inlet opening being connected to the primary condensate collecting tube, with said auxiliary inlet opening being connected to the secondary condensate collecting tube.

8. The recovery and treatment system of claim 7 characterized by said system further comprising a float switch positioned between said top cover and said connecting brace, and said float switch being electrically connected to the condensate producing system to shut it off when condensate entering said auxiliary inlet opening exceeds a predetermined amount.

9. The recovery and treatment system of claim 1 characterized by said bottom cover being attached to said bottom end of said housing via a threaded connection.

10. The recovery and treatment system of claim 1 characterized by said system having at least one float ball and at least one valve seat and one said float ball and one said valve seat being centrally located within said housing.

11. The recovery and treatment system of claim 1 characterized by said system having two P-traps, a float ball, and a valve seat, and said float ball and valve seat being positioned within said housing between said P-traps.

12. The recovery and treatment system of claim 1 characterized by said system further comprising opposed mounting support appendages outwardly depending from said treatment chamber, and said appendages being configured for sliding connection to a mounting bracket having a complementary cutout configuration.

13. The recovery and treatment system of claim 1 characterized by said treatment chamber having a removable cap and a removable internal basket configured for holding in stacked configuration a plurality of sanitizing tablets capable of releasing sanitizing vapors.

14. The recovery and treatment system of claim 1 characterized by said filter assembly housing, said bottom cover, said top cover, said connecting brace, and said treatment chamber all being made from plastic materials.

15. The recovery and treatment system of claim 1 characterized by said system further comprising additional components in downstream fluid communication with said discharge opening of said treatment chamber that are selected from a group consisting of vents, pressure relief valves, condensate holding tanks, pumps, and filtering apparatus.

16. The recovery and treatment system of claim 1 characterized by said system further comprising a float switch positioned between said top cover and said connecting brace, and said float switch being electrically connected to the associated condensate producing system to shut it off when condensate levels exceed a predetermined depth.

17. The recovery and treatment system of claim 1 characterized by said system further comprising an insulating wrap configured and adapted for preventing dew point moisture from accumulating on said filter assembly housing, said bottom cover, said top cover, and said treatment chamber.

18. The recovery and treatment system of claim 1 characterized by said housing having an upper surface and said inlet opening being positioned through said upper surface.

19. The recovery and treatment system of claim 1 characterized by said filter assembly housing, said bottom cover, said top cover, and said treatment chamber all being made from materials selected from a group consisting of transparent materials, translucent materials, and opaque materials.

20. The recovery and treatment system of claim 19 characterized by said system further comprising an insulating wrap configured and adapted for preventing dew point moisture from accumulating on said filter assembly housing, said bottom cover, said top cover, and said treatment chamber, and said insulating wrap being made from materials selected from a group consisting of transparent materials, translucent materials, and opaque materials.

* * * * *